(12) United States Patent
Biermann et al.

(10) Patent No.: US 8,221,278 B2
(45) Date of Patent: Jul. 17, 2012

(54) SPUR GEAR DIFFERENTIAL

(75) Inventors: Thorsten Biermann, Mühlhausen (DE); Ramon Jurjanz, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 300 days.

(21) Appl. No.: 12/525,130

(22) PCT Filed: Dec. 6, 2007

(86) PCT No.: PCT/EP2007/063428
§ 371 (c)(1),
(2), (4) Date: Mar. 19, 2010

(87) PCT Pub. No.: WO2008/092525
PCT Pub. Date: Aug. 7, 2008

(65) Prior Publication Data
US 2011/0045934 A1    Feb. 24, 2011

(30) Foreign Application Priority Data
Jan. 31, 2007  (DE) .......................... 10 2007 004 710

(51) Int. Cl.
*F16H 48/10*  (2012.01)
*F16H 48/11*  (2012.01)
(52) U.S. Cl. ........................................ 475/248; 475/252
(58) Field of Classification Search .................. 475/248, 475/252
See application file for complete search history.

(56) References Cited

U.S. PATENT DOCUMENTS

| | | | |
|---|---|---|---|
| 2,269,734 A | 1/1942 | Powell | |
| 2,651,215 A | 9/1953 | Schoenrock | |
| 3,375,735 A | 4/1968 | Saari | |
| 3,738,192 A | 6/1973 | Belansky | |
| 5,971,882 A * | 10/1999 | Nishiji | 475/252 |
| 6,080,076 A * | 6/2000 | Kwoka et al. | 475/160 |
| 2006/0089227 A1* | 4/2006 | Fanselow et al. | 475/248 |
| 2006/0247088 A1* | 11/2006 | Valente | 475/248 |
| 2007/0167272 A1* | 7/2007 | Higano et al. | 475/248 |

FOREIGN PATENT DOCUMENTS

EP    0918177    5/1999

(Continued)

OTHER PUBLICATIONS

EPO International Search Report for PCT/EP2007/063428, Mar. 12, 2008, 3 pages.

(Continued)

*Primary Examiner* — Edwin A Young
(74) *Attorney, Agent, or Firm* — Reising Ethington P.C.

(57) ABSTRACT

The invention relates to a spur gear differential (66) comprising a housing (68) that is embodied as a sum wheel (50) and that rotates around a longitudinal rotational axis (4), at least three planet gears (21, 22) disposed on the periphery at a distance in relation to each other around the rotational axis (4), and a drive wheel (67) at the housing (68), with the housing (68) comprised of at least two housing sections (75) fixed to each other, each of the planet gears (21, 22) mounted longitudinally on both sides in the housing sections (75), at least one of the housing sections (75) formed in the shape of a pot, with the housing section (75) formed from a pot (76) having a base (65) arranged on the front side of the housing, a wall starting from the base (65) and extending around the rotational axis (4).

6 Claims, 6 Drawing Sheets

FOREIGN PATENT DOCUMENTS

| | | |
|---|---|---|
| EP | 1717485 | 11/2006 |
| JP | 11108156 | 4/1999 |

OTHER PUBLICATIONS

German Search Report for DE 10 2007 004 710.1, Feb. 14, 2008, 4 pages.

Hoehn B-R et al: "Kompaktes Achsgetriebe Fuer Fahrzeuge Mit Frontantrieb Und Quer Eingebautem Motor", ATZ Automobiltechnische Zeitschrift, Vieweg Publishing, Wiesbaden, DE, vol. 108, No. 1, Jan. 2006, pp. 46-51, XP001238419 ISSN: 0001-2785.

\* cited by examiner

Fig. 4
( Detail Z )

SPUR GEAR DIFFERENTIAL

FIELD OF THE INVENTION

EP 0 918 177 A1 shows spur gear differentials of the category-defining prior art. For better understanding, the differential of the category-defining prior art is schematically represented below in FIG. 1 in a simplified manner and described below. The principle corresponds to an embodiment of the differentials described in EP 0 918 100 770 A1, which will be explained in greater detail in the following.

The planet carrier, or the planet carrier's housing, of the category-defining type is the differential's so-called sum wheel. The sum wheel represents the element that has the maximum torque, in each case. The input shafts are coupled to the driven gears in a rotationally fixed manner, representing the so-called difference shafts. Said difference shafts each forward a difference of the torques introduced into the differential, for example to the driven wheel vehicle. In the category-defining prior art described hereinabove and below the planet carrier 5, or the housing of the planet carrier 5, represents the sum wheel 50 of the planet drive.

In EP 0 918 177 A1 either the ring gears or the sun gears as driven gears have been equated to the difference shafts, since said difference shafts are each connected to the input shafts in a rotationally fixed manner, or coupled to said input shafts via additional transmission members. Hence, the driven gears are also referred to as differential elements below.

A practical example of the spur gear differential described hereinabove is illustrated in a scientific paper in ATZ 01/2006 "Compact Final Drive for Vehicles with Front Wheel Drive and Transversely Mounted Engine" by the authors Höhn/Michaelis/Heizenröther. The paper describes two versions of the combination of drive wheel and planet carrier. One version is referred to as light-construction version and is comprised of a separately manufactured spur gear, said spur gear being connected to the carrier by means of laser welding. Under the most unfavorable conditions, the heat introduced by the welding may cause distortions inside the component and require costly subsequent work. The other version provides for the planet carrier and the drive wheel to be manufactured from one piece by forging, with subsequent finishing cutting. Such embodiments are very costly in terms of the quantity of the material for production and due to the time-consuming production.

One criterion to assess the operational accuracy of a planet drive is the accuracy of the engagement of the mutually engaging planet pairing planets—sun and planets—ring gear. Beyond the usual manufacturing tolerances the accuracy of the engagement in turn depends on dislocations and deformations that occur while the spur gear differential is in operation.

The advantage of the spur gear differential in prior art can be attributed to its light construction from sheet metal. However, the thin sheet metal can have a negative effect on the initially mentioned deformation behavior of the planet drive. Accordingly, in turn it can also be disadvantageous if the contact radius is too big. In such a case, the use of thicker sheet metal to compensate for deformation susceptibility would at least partially undo the advantages of the light-construction differential.

Figure 1:
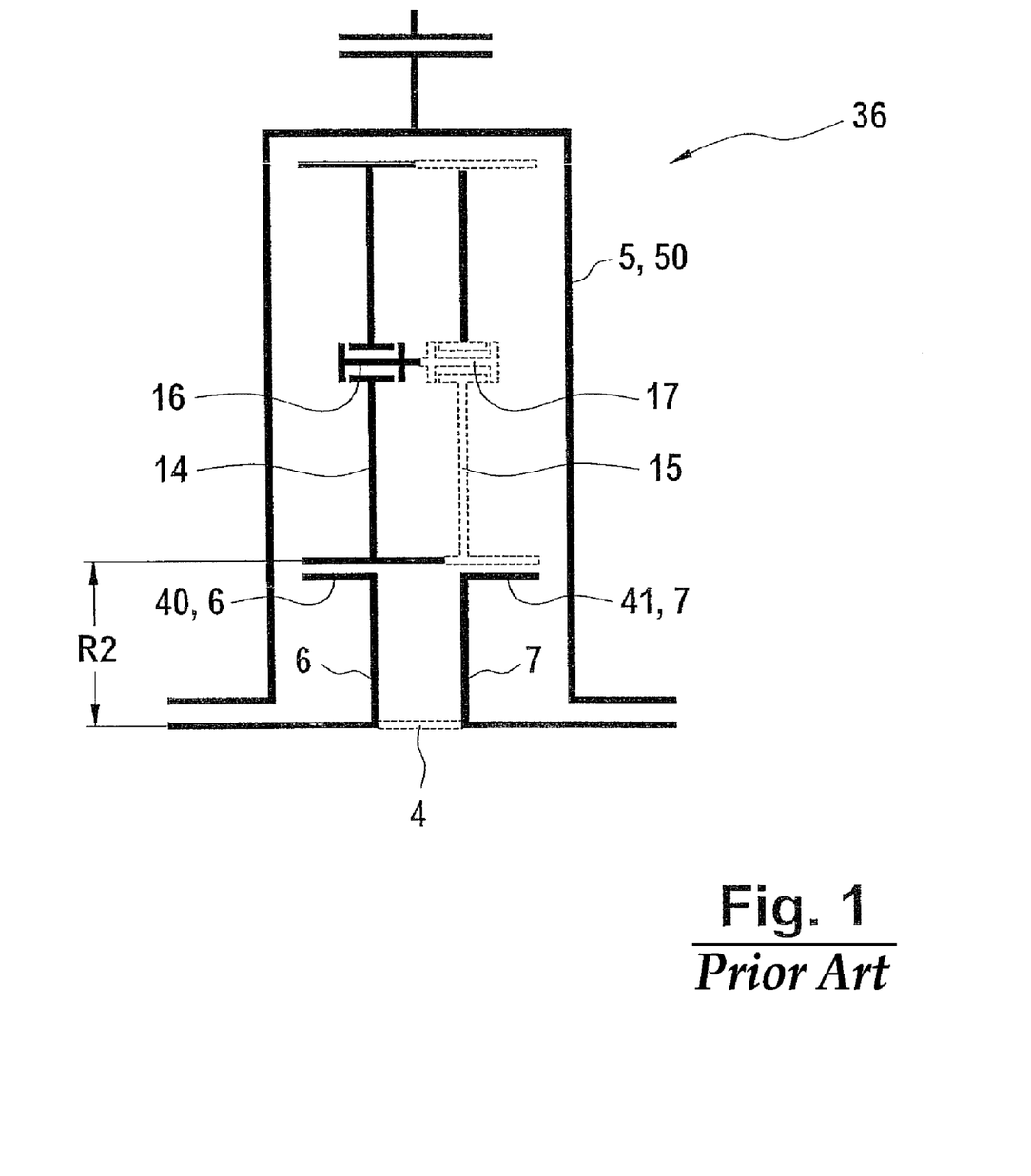
FIG. 1 schematically illustrates the principle of a spur gear differential of the underlying prior art of the invention, with the sun gears being differential elements.

In EP 0 918 177 A1 and in the aforementioned ATZ scientific paper the embodiment of the spur gear differential, whose differential elements are ring gears, is preferred compared to the classic bevel gear differential and compared to the spur gear differentials 36 of the type pursuant to FIG. 1, since the contact radius between drive and driven gear in the spur gear differential, whose differential elements are ring gears, is greater than the contact radius R2 in the spur gear differential 36 given the same radial external dimensions.

The spur gear differential 36 comprises a drive wheel 2, which in this case is designed as crown gear. Moreover, the spur gear differential 36 made of a two-part housing is held together as sum wheel 50, in which planet gears are arranged on planetary shafts (also referred to as bearing pin) and two sun gears 40 and 41 as driven gears 6 and 7.

The housing is formed by a pot-shaped housing section and a disk-shaped section. Each of the housing sections comprises receptacles for the planetary shafts. The pot-shaped housing section is provided with a radial flange, with said pot-shaped housing section and said disk-shaped section being screwed and welded to said radial flange pursuant to EP 0 918 177 A1. The drive wheel is positioned in a radial manner on the pot-shaped housing section.

Figure 2:
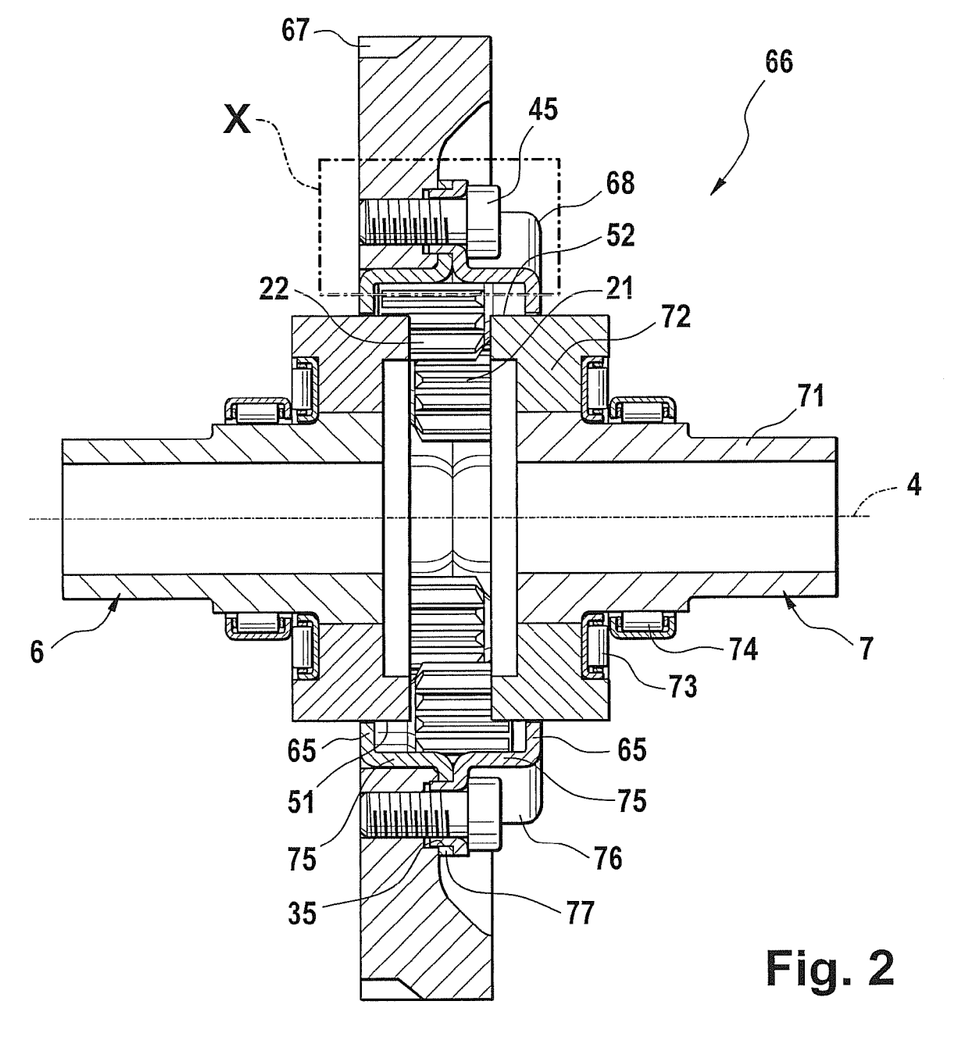
FIG. 2 represents an exemplary embodiment of a spur gear differential according to the invention, cut longitudinally along the rotational axis.

The planet gears 14 and 15 are again arranged in pairs, with one planet gear 14 each forming a pair with one planet gear 15 each, and being geared with each other as well. The mutual engagement of the planet gears into one another is symbolized in FIG. 1 by the dotted lines. The planet gears 14 are simultaneously meshed with the sun gear 40, and the planet gears 15 with the sun gear 41. The spur gear differential 36 comprises no ring gears. The sun gears 40 and 41 represent driven gears and thus differential elements. In FIG. 2 the contact radius R2 must be equated with the shaft center distance between the pin axes 16 or 17, respectively, and the rotational axis 4 of the driven gear, and depends on the radial dimensions of the respective pairing of the planet gear with the respective sun gear 40 or 41.

The installation space available to such differentials at the vehicle is usually small, so that the differentials should comprise relatively small external dimensions. However, as is also described in EP 0 918 177 A1, the ability to transmit torques is essentially determined by the average contact radius in addition to the criteria tooth width, geometry and others. Subject to the initially mentioned influence of deformation susceptibility, the greater the contact radius is the higher the amount of transmittable torques.

Although the spur gear differential described in EP 0 918 177 A1 as a preferred version, whose planets mesh in ring gears, actually has an advantage vis-à-vis a classic bevel gear differential with equal dimensions, or vis-à-vis the version described in FIG. 1, due to the external engagement between planet and drive side, and thus in terms of its capacity to transmit torques, the objective is still to embody the differentials as light and small as possible, and very highly resistant.

The pin axes of the planetary shafts of a pair are arranged in series on the periphery. The amount of planetary gear pairs that may be arranged on the periphery depends on the distance on the periphery determined by the dimensions of the planet gears, said distance also being materially dependent on the embodiment of the bearing positions for the planet gears and on their surrounding structures.

The differential described in EP 0 918 177 A1 and the corresponding practical example implemented in the aforementioned scientific paper each embody three pairs of planet gears symmetrically distributed on the periphery—EP 0 918 177 A1 however indicates that more than three pairs may be utilized if higher torques need to be transmitted by the differential. The use of more than three pairs and the transmission of high torques are difficult in terms of the available installation space in the arrangements of both embodiments in prior art pursuant to FIG. 1 of EP 0 918 177 A1. A further difficulty for the light construction sheet metal differentials are the earlier described tolerance limits of the sheet metal planet carrier determined by deformations. If such differentials are to be embodied for higher tolerances, more installation space is required accordingly. The differential becomes heavier and more expensive. Thus, these types of the category-defining prior art are preferably inserted into differentials with which relatively small torques need to be transmitted.

As initially mentioned, the tooth width is also a criterion for the amount of transmittable torque. The wider the engagement is, the higher the torques that can be transmitted. As a result of the more widely designed engagement the differentials require more installation space in lateral direction, thus axially, thus becoming heavier and more expensive overall.

In the earlier described spur gear differentials the planet gears of a pair engage with one other. Simultaneously, each of the planet gears of a pair meshes with another differential element as the other planet gear of the pairing. If one or both planet gears were to be in mesh with both differential elements (for example simultaneously with both sun gears) in this differential, the compensation in the differential would be blocked. Thus, when laying out the design of the planetary drive, ample free space must be provided for the toothing of each of the two differential elements separately vis-à-vis that planet gear with which the toothing may not be in mesh with the respective differential element. For this purpose, ample axial installation space between the engagement to each respective sun is provided in the differential pursuant to EP 09 918 177 A1—schematically represented in FIG. 1—in that the planet gear is longer by the amount of the axially needed installation space. Such a design requires additional axial installation space due to the axially longer planet gear.

OBJECT OF THE INVENTION

It is therefore the task of the invention to create spur gear differentials that require little installation space for themselves, but are still capable of transmitting high torques, and that can be produced simply and economically.

DESCRIPTION OF THE INVENTION

This task is solved with a spur gear differential that uses on its periphery installation space for the connection of the housing sections between the individual pairs of the planet gears.

The spur gear differential is comprised of an at least two-part housing embodied as a sum wheel that can rotate around a longitudinal rotational axis, and at least three planet gears that are disposed on the periphery at a distance in relation to each other around the rotational axis, and a drive wheel at the housing. The housing is formed from at least two housing sections that are fixed to each other. One of the housing sections may be embodied as a pot or a bowl, and the other one as a lid. Preferably, however, both housing sections are embodied like a pot and identical parts.

The wall of the pot that extends around the rotational axis comprises at least two wall sections curved towards the inside in a radial manner, i.e. the wall is drawn or curved towards the inside in these areas in the direction of the rotational axis—namely into the peripheral gap between two of the planet gears that are adjacent to each other on the periphery. The planet gears adjacent to each other at the peripheral gap preferably belong to a planet pair of two planet gears that engage with one another. The preferred embodiment provides for four of the planet pairs, and thus for four of the mounting sections that mesh at least partially into the peripheral gaps in a radial manner.

The connection between the housing sections becomes more rigid, so that the entire differential is more rigid and less susceptible against deformations and dislocations. Furthermore, less radial installation space for the drive wheel, or for its mounting at the housing, is possibly required, since the mounting was radially shifted—at least in part—between the planets.

(1) The smallest hole circle for clearance holes or pins of a flange connection is larger than the largest enveloping circle of the planet gears that are radially furthest removed from the rotational axis.

(2) Alternatively, the diameter of the largest hole circle is still smaller than the largest enveloping circle around the planet gears, i.e. the holes of the flange connection, in whole or in part, are comprised between the individual planet pairs within the enveloping circle on the periphery.

(3) The housing is comprised by a pot-shaped housing section and a disk-shaped section.

(4) The pot-shaped housing section and the disk-shaped section preferably consist of cold formed parts, e.g. drawn and punched parts of thin sheet metal, into which the receptacles for the planet gears and also the differential elements have been inserted. Such components can be produced cost-effectively.

(5) Alternatively, the two-part housing is comprised of two preferably identical housing sections, both of which are pot-shaped and feature flanges to establish a connection to each other.

(6) The flanges comprise clearance holes, through which screw elements, such as stud bolts, or screws engage.

(7) Instead of clearance holes, one of the housing sections comprises cylindrical guide pins on the peripheral side. The preferably hollow cylindrical inner parts protrude axially from the flange.

(8) Each guide pin is inserted into one clearance hole each of a hole flange at the other of the housing sections. From a cross-sectional point of view the inner contour of the clearance hole in the hole flange corresponds accurately fitting to the outer contour of the guide pin.

(9) The hole flange of one housing section is positioned on the guide pin and is centered on said guide pin.

(10) A connecting element preferably engages longitudinally through the guide pin, either into a thread in the drive wheel or, alternatively, is screwed or riveted. Alternatively, or additionally, the screw or rivet connection can also be arranged separately from the guide pins at a different location.

(11) The clearance holes or pins of a flange connection are arranged either on a joint hole circle, or individually on hole circles with diameters that differ from one another.

The hole circle is an imaginary circle, whose center is vertically penetrated by the rotational axis, and on whose circle line the central axis of at least one of the clearance holes of the flange connection aligned in parallel to the rotational axis is located. Mostly several central lines of clearance holes are arranged on one joint hole circle in one flange connection. It is, however, also conceivable that on the periphery clearance holes of one flange connection adjacent to one another with different radial [missing text] are inserted in distances to the rotational axis inside the flange, so that they necessarily comprise different hole circles to each other.

The enveloping circle around the planet gears is an imagined circle, whose center is vertically penetrated by the rotational axis, and which is positioned outside around the planet gears on the periphery at a distance in relation to each other. The enveloping circle is comprised of at least two planet gears adjacent to one another on the periphery, whose pin axes are positioned radially in an equidistant manner from the rotational axis. Accordingly, the largest enveloping circle is an enveloping circle that comprises the outside planet gears, those that are radially farthest located from the rotational axis Housing sections comprising the characteristics (5) through (11) are mutually supported through the pin guide, particularly peripherally, so that the screw connection is free from peripheral stresses caused by the torques (shear stress). The number of mounting elements, such as screw elements or rivets, can be reduced.

The planet gears and sun gears are comprised and arranged as follows in the differential according to the invention:

a. Each planet pair is comprised of two planet gears that are preferably embodied identically as identical parts.

b. The planet gears are each comprised of non-toothed section on the outside of a cylinder and alongside a toothed section.

c. The radial outer dimensions (outside radius) of the non-toothed section are lower than the smallest possible radial outermost dimensions (for example tip circle radius) of the toothed section. In this connection, the outside diameter of the non-toothed section is at least smaller than the tooth tip diameter, preferably, however, equal to or smaller than the tooth base diameter of the toothed section.

d. The toothed section of the viewed planet gears is comprised of spur gearing, such as spur bevel gearing, helical gearing, splining, or screwed-shaped toothing.

e. Each of the planet gears is located either on a separate planetary shaft, or is received on two pins, or itself comprises two pins protruding axially from the planet gear.

f. The planetary shaft, or the planet gear comprising pins, or the planet gear on pins, is mounted on both sides inside or at the housing.

g. The pins, with which the respective planet gear is alternatively received, are comprised either in one piece with a sheet metal housing, or inserted as separate components in said housing.

h. Alternatively to aforementioned embodiments of the planet gears' mounting, one-piece or multi-part pins are designed in one material with the planet gear, or separately as elements attached to the respective planet gear.

i. In these cases the planet gear is either pivot-mounted on the pins or on the planetary shaft around the pin axis, or mounted with pins.

j. The non-toothed sections of the planet gears extend longitudinally in opposite direction, so that the front ends of the non-toothed sections each extend longitudinally outward, preferably towards the mounting of the planet pins inside the housing.

k. Each of the planet gears of one pair each extends with a segment of its toothed section, said segment being positioned in longitudinal direction on the outside of the planet gear, into the toothing of another of the two differential elements of the differential.

l. Viewed in longitudinal direction of the planet gear, namely aligned with the pin axis, the section positioned on the outside (outside segment) extends from one end of the planet gear to one longitudinally middle segment of the toothing.

m. The width of the outside segment, with which the respective planet gear extends into the inner or outer toothing of the differential element, respectively, preferably corresponds to half the width of the toothing in longitudinal direction of the toothed segment.

n. In each case the toothing of that differential element of the two differential elements radially and axially dips without contact into the peripheral gap of each planet gear of a pair—said peripheral gap being comprised around the non-toothed segment—that engages with the outer segment of the toothing of the other planet gear of the same pair.

o. The peripheral gap is axially limited in one longitudinal direction by the longitudinally inner central segment of the toothing, and in the other longitudinal direction, for example, by the housing or by another axial stop for the planet gear.

p. The planet gears of one pair each engage at the middle segment of the toothed section with each other.

q. The middle segment is comprised in longitudinal direction between the outer segment of the toothing and the non-toothed section.

r. Type and dimension of the toothing of the outer segment may continue at the middle segment, but alternatively, can also be different ones.

s. The width of the middle segment, at which the planet gears are engaged with one another, is preferably the other half of the width of the toothing in the longitudinal direction of the toothed section.

t. At least three, preferably however four or five pieces of the pairs are arranged for each differential.

The longitudinal direction is equivalent to the pin axes. If above or below the term tooth width and synonymous terms are used, the dimension of the toothing aligned with the pin axis is referred to.

Each of these planet gears comprises the non-toothed section, so that in these spur gear differentials each of the planet gears of a pair does not engage with both differential elements simultaneously (with both sun gears or rings gears).

The following results from the aforementioned characteristics:

u. The required overall width of the toothed section of each of the planet gears preferably corresponds to the sum resulting from the width of the differential element, in mesh with the planet gear, and from the width of the segment of the toothing, with which the planet gears of the same pair engage with one another—at most plus distances, bevels, distance pieces, and the like, due to manufacture, assembly, or design.

v. The required width of the non-toothed section of the planet gear preferably corresponds to the width of the toothing of the differential element that engages with the other planet gear of the same pair—at most plus distances, bevels, distance pieces, and the like, due to manufacture, assembly, or design.

w. The toothing of the differential element dips into the peripheral gap as far as possible without the differential element and the respective planet coming into contact.

The tooth width for the engagement of the components of the differentials according to the invention engaged with each other is wider than that of the previous category-defining prior art with the same dimensions—since planet gears in pairs are nested one inside the other, and with the differential elements without additional axial gaps. Higher torques can be transmitted. The planet gears are not aligned at a separate planet carrier along the center in the differential, but on both sides inside the housing that functions as a planet carrier. Due to the two bearing positions—instead of one—the construction is more rigid and less susceptible against tipping, and thus less susceptible against the advantages caused by tipping.

The pairs of a planetary drive can be moved closer on top of one another on the periphery, since, for one, the stresses per planet are distributed to two bearing positions inside or at the housing, in each case, and, on the other hand, the housing design per se is already more stable than a disk-shaped sheet metal planet carrier aligned in the center. The installation space that needs to be available on the periphery between the individual bearing positions for supporting material is small. The need for installation space for a centrally aligned planet carrier is eliminated since the bearing is located inside the housing. The toothing can additionally be designed broader by this amount. This, in turn, allows reducing the contact radius, and one can resort to the more rigid embodiment, and thus against deformations, of less susceptible designs as those in FIG. 2, which depicts the planet gears engaging with the sun gears. The manufacture of the planetary drive is more cost-effective, since the expensive production of the ring gears is eliminated. Processing the interior of the internal toothing, for example, is costly.

The housing sections as well as the sun gears are mounted coaxially to each other on a joint rotational axis of the differential. The sun gears are alternatively pivot-mounted around the rotational axis with slide bearings or with ball bearings in the housing. Vis-à-vis the surrounding design the housing itself is preferably mounted on a ball bearing around the rotational axis, but can also be mounted on a slide bearing.

Additional embodiments of the invention relate to the drive wheel and its mounting on the housing according to the following characteristics and any sensible combinations thereof:

i. Preferably, the drive wheel is a spur gear with any type of spur gearing of all conceivable embodiments.

ii. Alternatively, the drive wheel is a toothed ring, its internal circumference mounted at least in part on a conical outer or cylindrical outer section, preferably on the pot-shaped housing section.

iii. The toothed ring is axially supported at the radial flange.

iv. The fit is embodied with either a clearance fit, a transition fit or a drive fit, or blocked by the conical connection itself.

v. Alternatively, or in addition to the aforementioned characteristics iii. through iv., the toothed ring is mounted on the housing by material fit such as welding, or secured by means of a screw fitting.

vi. Preferably, the screw fitting is simultaneously provided for the connection of the two housing parts with one another.

vii. Alternatively, in addition to the version earlier described by the characteristics i. through vi., the toothed ring comprises two interior peripheral surfaces that differ from each other in terms of their diameter.

viii. The interior peripheral surface comprising the larger inner diameter is mounted on at least one radial flange of one of the housing sections.

ix. The inner peripheral surface comprising the smaller inner diameter is mounted on one of the housing sections.

x. The toothed ring rests on a radial flange with an annular surface radially aligned between the two inner peripheral surfaces.

xi. Threaded holes with internal threads extend axially from the annular surface, with either one stud bolt or one screw each for mounting the toothed ring to the housing, and/or for mounting the housing section together, being screwed into said threaded holes.

xii. Alternatively, for all aforementioned embodiments, cylindrical guide pins, instead of the clearance holes, are arranged on the periphery at one of the housing sections, or alternately, at both housing sections. The guide pins comprising a hollow cylindrical interior axially protrude from the flange in the direction of the other housing section.

xiii. In each case, each guide pin engages through a clearance hole of an opposite flange with holes at the other housing section. The outer contour of the guide pin corresponds with the inner contour of the clearance hole such that the guide pin is led tightly inside the clearance hole. The housing section is concentrically centered in the clearance holes of the other housing section via several guide pins distributed at the periphery [missing text] to the rotational axis and to the other housing section.

xiv. An additional guide pin is arranged at the drive wheel. At least in its outer contour the additional guide pin is identical to the guide pin at the housing section, and extends axially through the clearance hole from the other side. The drive wheel is concentrically centered in the clearance holes of the other guide pins via several guide pins distributed at the periphery [missing text] to the rotational axis and to the housing. In each case, one mounting means engages through the hollow guide pins and axially holds the elements together.

xv. In each case, each guide pin engages in a guide hole of the toothed ring through one clearance hole of a flange with holes past the other of the housing sections. From a cross-sectional point of view the inner contour of the guide hole in the toothed ring corresponds accurately fitting to the outer contour of the guide pin. The toothed ring and the housing are centered concentrically to each other [missing text] to the rotational axis.

xvi. In the guide hole an internal thread or a clearance hole for the axial mounting of the housing sections with the toothed ring by means of a screw or rivet connection follows the guide sections.

xvii. The guide pin is comprised in one piece with the flange of the corresponding housing section made from the latter's material.

xviii. The guide pin is a separate sleeve, which is mounted to the flange of the corresponding housing section, preferably by means of a press fit and/or a material fit.

Torques introduced into the drive wheel are directly forwarded to the housing sections by the drive wheel via the guide pins, without the connecting elements being stressed by the shear forces. Thus, the differentials can tolerate significantly higher torques.

Additional embodiments of the invention relate to embodiments of the sun gears described below:

I. The sun gears preferably comprise identical parts in terms of their shape.

II. The sun gears are comprised of two hollow cylindrical sections whose radial external dimensions differ from each other.

III. The hollow cylindrical section with the radially larger external dimensions comprises a frontally surrounding toothing for engagement in the planet gears.

IV. The sun gears are each pivot-mounted with a shoulder in longitudinal direction axially at one housing section each by means of slide bearings or ball bearings around the rotational axis of the spur gear differential. The shoulder extends radially between the external toothing and the hollow cylindrical section with the radially smaller external dimensions.

V. Each of the sun gears is radially pivot-mounted, in each case in a hollow cylindrical receptacle of one of the housing sections by means of slide bearings or ball bearings around the rotational axis of the spur gear differential.

VI. The sun gears are identical pieces, i.e. their design and dimensions are identical.

VII. The sun gears are comprised in one piece.

VIII. Alternatively to characteristic VII, the sun gears are assembled components comprised of one toothed ring on a base body, with the toothed ring preferably being the section with the larger radial dimensions, and the base body the hollow cylindrical toothed ring with the smaller radial dimensions.

IX. Alternatively, and/or simultaneously to the characteristics I through VIII, elements of universal joints, for example cones (external housing) with tracks, for tripod rollers, for example, have been integrated into the sun gears.

BRIEF DESCRIPTION OF THE DRAWINGS

Category-defining prior art is also described based on the FIGS. 1 and 2 in the chapter Field of the Invention at the beginning of this document, and exemplary embodiments of the invention have been described beginning with FIG. 3 as follows.

DETAILED DESCRIPTION OF THE DRAWINGS

Figure 3:
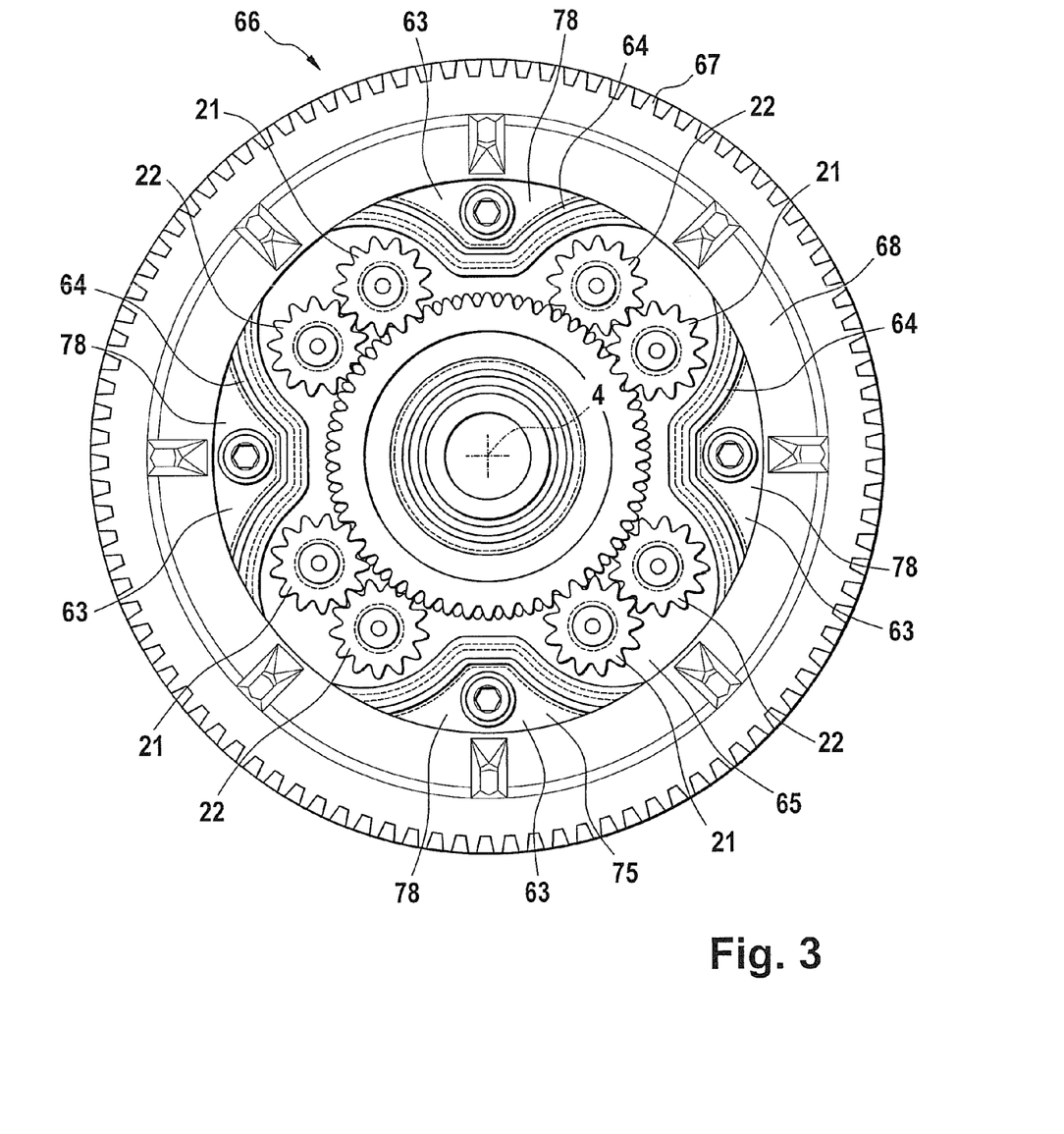
FIG. 3 shows a frontal view of the spur gear differential according to FIG. 2.

The spur gear differential 66 according to FIG. 2 is provided with a drive wheel 67 and comprises a two-part housing 68. The planet gears 21 and 22 have been arranged in the housing 68 in pairs. As can be seen from FIG. 3, the spur gear differential 66 comprises four pieces of the pairs. The planet gears 21 and 22 are engaged with the toothings 51 or 52, respectively, at the sun gears 69 and 70. The sun gears 69 and 70 represent the driven gears 6 and 7 and thus the differential elements of the planetary drive. The driven gears 6 and 7 are pivot-mounted separately from each other around the rotational axis 4 and are connected with drive shafts that are not shown.

The sun gears 69 and 70 comprise identical parts. Each sun gear 69, or 70 respectively, is comprised of two parts from a hollow cylindrical section 71 and a hollow cylindrical section 72. The radial dimensions of the hollow cylindrical section 71 are smaller than the radial dimensions of the hollow cylindrical section 72. The hollow cylindrical section 72 comprises a toothed ring, either with external toothing 51 or 52. The toothed ring is pressed on the hollow cylindrical section 71 and/or mounted in a differently suitable way with a positive fit, a non-positive fit and cohesively. Tracks for ball bearings 73 and 74 are comprised at the respective sun gear 69, or 70 respectively. The ball bearing 73 is for the axial bearing of the respective sun gear 69, or 70 respectively, and the ball bearing 74 is a radial bearing.

Figure 4:
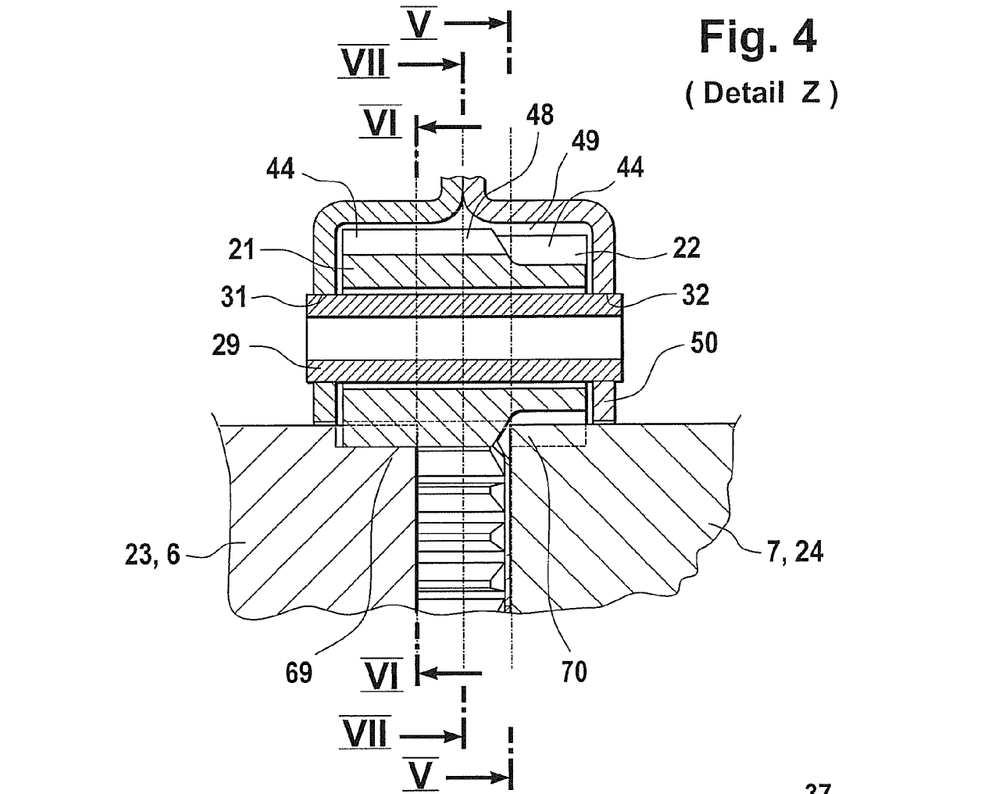
FIG. 4 illustrates the arrangement of a pair of planet gears in the spur gear differential, not to scale and enlarged.
Figure 4A:
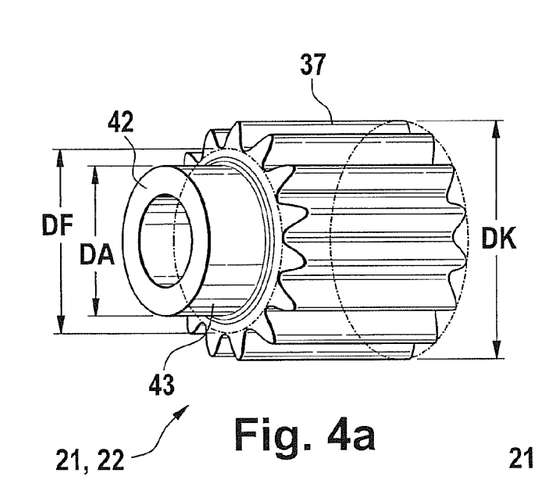
FIG. 4a depicts an exemplary embodiment of a planet gear, shown as a single part.

The housing 68 is comprised of two housing sections 75 identical to each other and represents the sum wheel 50. The housing sections 75 are essentially comprised in the shape of a pot and provided with a radial flange 77. Preferably, the pot-shaped housing sections 75 are cold formed parts, e.g. drawn and punched parts of thin sheet metal. Each of the housing sections 75 comprises receptacles 31 and 32 (FIG. 4) for planetary shafts 29 and 30 (FIGS. 2, 4 and 4a).

The base 65 of the respective housing section is comprised at the face of the housing 69. The planet gears 21 and 22 are mounted in the bases opposite each other. The pot 76 of the respective housing section 75 is formed at the periphery at several points towards the inside in the direction of the rotational axis (4) (FIG. 3), so that limited radial taperings 78 are generated at the pot 76 by the planet gears 21 and 22 through the curved wall sections 64, in each case between two pairs that are adjacent to each other on the periphery. In the view according to FIG. 3 the shape of the pot 76 is reminiscent of a four-leaf clover. With its flange sections 63 the radial flange 77 extends in the direction of the rotational axis 4, up to the taperings 78, and comprises there the clearance holes 35 for mounting the housing sections 75 together, and for mounting the drive wheel 67 at the housing 68. In addition, the drive wheel comprises radial mounting sections 62 that dip at least in part into one of the taperings 78, in each case. Mounting elements, such as screws 45, are arranged at least in part on the periphery between two adjacent pairs comprised of planet gears 21 and 22.

The arrangement of the sum wheel and the difference shafts corresponds to that of FIG. 1.

The details of the engagement of the planet gears 21 and 22 are described in FIGS. 4, 4a, 4b through 7. Each of planet gears 21 and 22 is separately mounted on the planetary shaft 29, or 30 respectively, on slide bearings or ball bearings. The planet gears 21 and 22 of a pair are engaged with each other via the toothed sections 37. Moreover, each of the planet gears 21 and 22 of a pair engages with a different of the two driven gears 6 or 7, respectively, comprised as sun gear 23 and 24, than the planet gear 21 or 22, respectively, of the same pair.

Figure 4B:
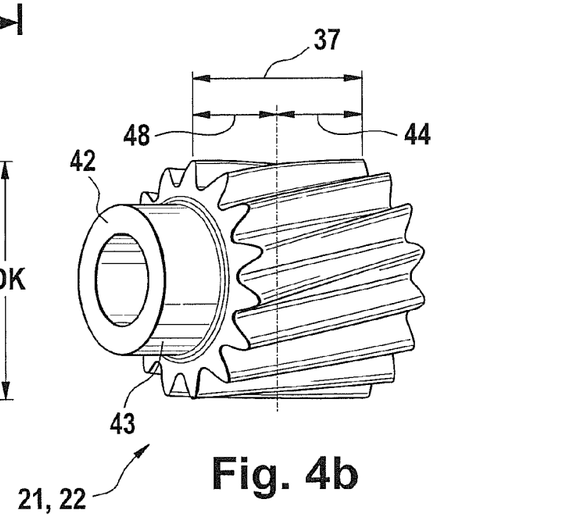
FIG. 4b depicts an additional exemplary example of a planet gear, shown as a single part.

FIG. 4 shows the planet gears 21 and 22 in the external toothing 51, or 52 respectively, of the sun gears 69, 70 of the spur gear differential 66. The planet gears 21 and 22 are configured identically to each other, and embodied in a remote manner. FIGS. 4a and 4b each show a planet gear 21, or 22 respectively, as an individual component, either with spur level gearing or with helical gearing. Said planet gears comprise a primarily cylindrically embodied non-toothed section 43, whose outside diameter DA is smaller than the outer diameter of the toothed section 37 at the tip circle DK. Section 43—free of toothing—and the toothed section 37 (section provided with one toothing) are directly adjacent to each other. Preferably, the outside diameter DA of the non-toothed section 43 is also smaller than root diameter FK of the toothing of the toothed section 37.

The planet gears 21 and 22 of one pair are arranged on the planetary shaft 29 and 30 such that the non-toothed sections 43 of the planet gears 21, 22 longitudinally point in opposite direction. The fronts sides of the non-toothed sections 43 each point longitudinally towards the outside, preferably to the receptacles 31, 32 for the planetary shafts 29 and 30 in the housing 68.

Each of the planet gears 21, 22 of one pair engages in the toothing of another driven gear 6, 7 of the differential with a segment 44 of its toothed section 37, said segment being located at the outside longitudinally at the planet gear 21, 22, in each case. In said differential the toothing of the driven gears 6 and 7 comprises an external toothing 51, or 52 respectively, at the sun gears 69 and 70.

The segment 44 located on the outside (outer segment) extends parallel to the pin axis 29, from one end of the planet gear 21, or 22 respectively,—from a longitudinal point of view—to a segment located on the inside (middle segment) of the toothed section 37 (see also FIG. 4b). In the foreground FIG. 4b shows a cross-sectional view of the planet gear 21. Only the outer portion of segment 44 of the planet gear 22 can be recognized through the peripheral gap 49. In this view, the peripheral gap 49 surrounds the non-toothed section 43 of the planet gear 21. The outer segment of toothed section 44 is about as wide as the radial shoulder 72 with external toothing 51, or 52 respectively, and only needs to be as wide as the external toothing 51 is wide longitudinally. The middle segment of toothed section 48 is as wide as the axial distance between the radial shoulders 60 of the sun gears 69 and 70.

Figure 5:
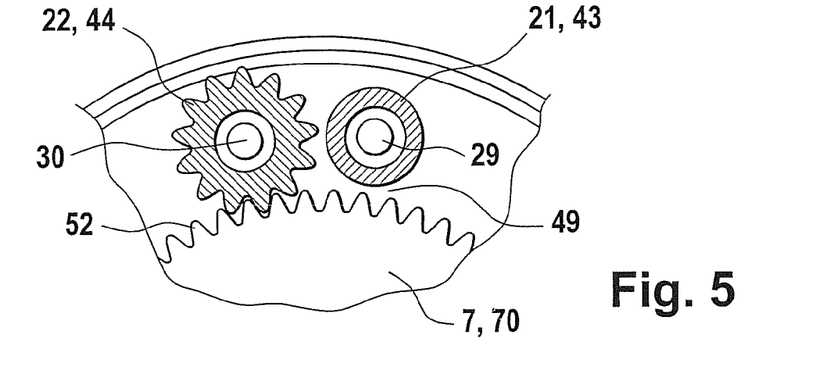
FIG. 5 shows a cross-section of the planet pair according to FIG. 4 along the V-V line.

FIG. 5 is a cross-sectional view along the V-V line in FIG. 4, and thus an illustration of the engagement at the right side of FIG. 4 of the respective spur gear differential 66. The outer segment of section 44 of planet gear 22 is engaged with the external toothing 52 of the sun gear 70. The non-toothed section 43 of the planet gear 21 is not engaged with the sun gear 70 on the right side of FIG. 4. The external toothing 52 of the sun gear 70 dips into the free space created by the periphery gap 49 at this location as far as possible without the external toothing 52 and the non-toothed section 43 coming into contact.

Figure 6:
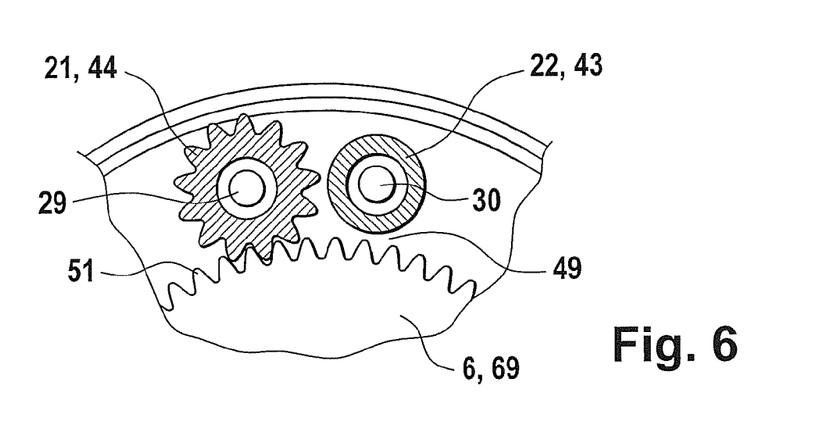
FIG. 6 shows a cross-section of the planet pair according to FIG. 4 along the VI-VI line.
Figure 7:
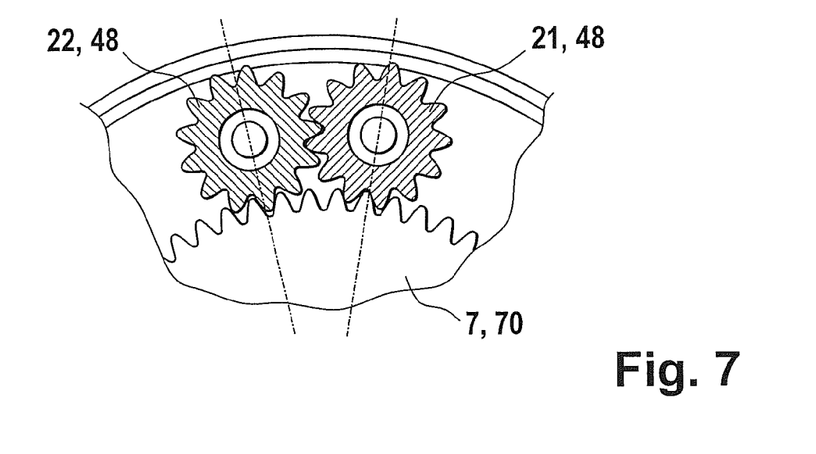
FIG. 7 shows a cross-section of the planet pair according to FIG. 4 along the VIII-VIII line.

FIG. 6 shows a cross-sectional view along the VI-VI line in FIG. 4, and thus an illustration of the engagement at the left side of the spur gear differential 68. With the outer segment of section 44 the planet gear 21 engages with the external toothing 51 of the sun gear 69. The non-toothed section 43 of the planet gear 22 is not engaged with the sun gear 69 on the left side of FIG. 4. The external toothing 51 of the sun gear 69 dips into the free space created by the periphery gap 49 at this location as far as possible without the external toothing 51 and the non-toothed section 43 coming into contact FIG. 7 shows a cross-sectional view along the VII-VII line, and thus an illustration of the engagement in the middle section of the respective spur gear differential 68 according to FIG. 4. Said FIG. 7 shows how the inner toothed segments 48 of the planet gears 21 and 22 of a pair engage with one another. To be sure, the illustration shows the sun gear 70 as well, however, it is not engaged with the segments 48. In this illustration the sun gear 70 is arranged vertically into the image plane according to the toothed segments 48. The middle segment 48 is comprised longitudinally between the outer segment 44 of the toothed section 37 and non-toothed section 43 (see also FIG. 4a).

Figure 8:
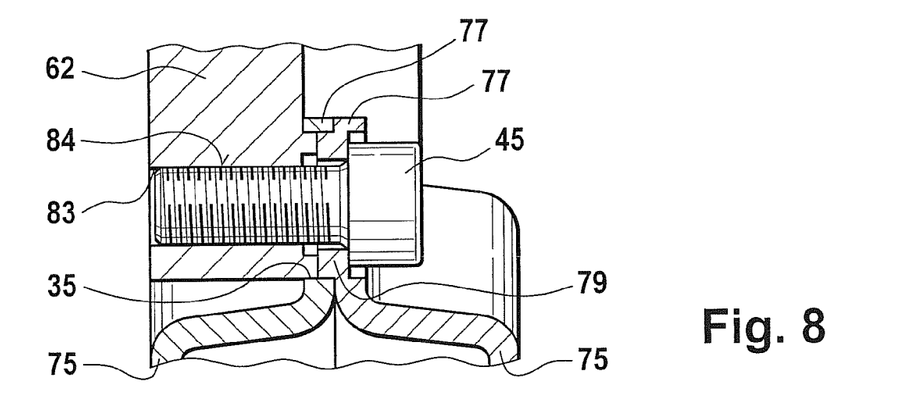
FIG. 8 shows the connection of the housing sections with the drive wheel based on the detail X from FIG. 2 enlarged and not to scale.
Figure 9:
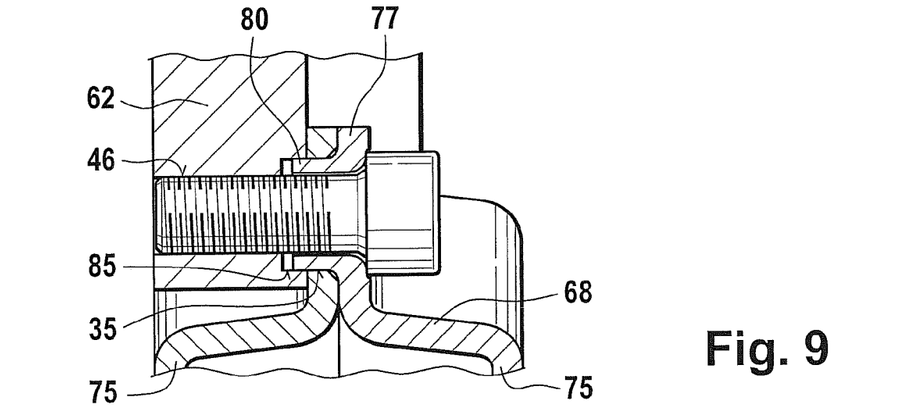
FIG. 9 shows the detail X from FIG. 2 enlarged and not to scale with a connection alternatively embodied to that of FIG. 8.
Figure 10:
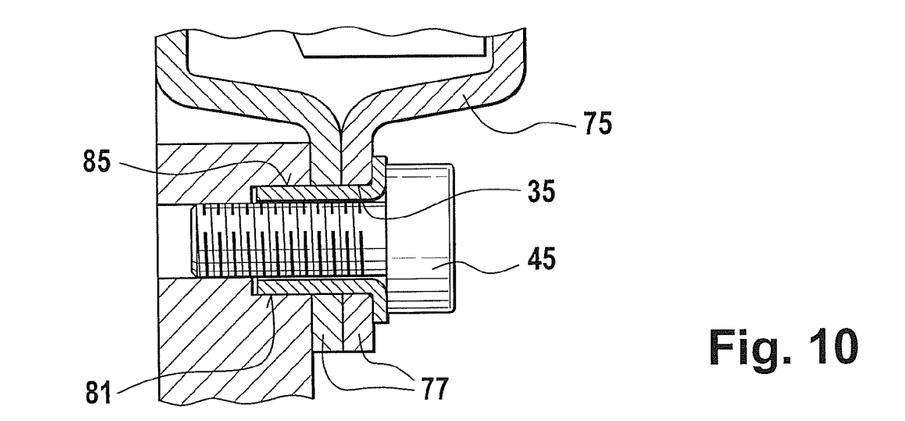
FIG. 10 shows the detail X from FIG. 2 enlarged and not to scale with an additional connection alternatively embodied to that of FIG. 8.

Alternatively, for all aforementioned embodiments of attaching the housing sections 75 to each other, cylindrical guide pins 79, 80 and 81, instead of the clearance holes 35, are arranged on the periphery at one of the housing sections 75, or alternately, at both housing sections 75. Such connections have been illustrated in the FIGS. 8, 9, and 10 and described below. The FIGS. 8, 9, and 10 are enlarged illustrations of the details X according to FIG. 2 that are not to scale. The cylindrical guide pins 79, 80 and 81, preferably hollow on the inside, protrude axially from the radial flange 77 in the direction of the other housing section.

FIG. 8 shows a punch-drawn guide pin 79, whose axial thickness essentially corresponds to the sheet thickness of the radial flange 77. Several of the guide pins have been arranged on the periphery of the housing section 75. The guide pin 79 is embodied in one piece with the radial flange 77 of the corresponding housing section 75 and is made of the same material.

Each of the guide pins 79 extends roughly half way into a clearance hole 35 of the opposite radial flange 77. An additional guide pin 82 extends into the other half of the clearance hole 35, said guide pin being embodied at the mounting section 62 of the drive wheel 67. Both guide pins 79 and 82 are comprised hollow. The guide pin 82 is followed by a clearance hole 83, or a threaded hole with internal thread 84, at the side facing away from the guide pin 79. The housing sections 75 and the corresponding drive wheel are axially attached to each other by means of a mounting element, in this case in the form of a screw 45.

In the exemplary embodiment of the invention shown in FIG. 9 each guide pin 80 extends through a clearance hole 35 of a flange with holes at the other of the housing sections 75 into a guide hole 85 at the mounting section 62 of the corresponding toothed ring. The guide pin 80 is drawn and embodied in one piece with the radial flange 77 of the corresponding housing section 75. From a cross-sectional point of view the inner contour of the guide hole 85 in the toothed ring corresponds accurately fitting to the outer contour of the guide pin 80. The toothed ring and the housing 68 are concentrically centered to each other [missing text] to the rotational axis.

In the guide hole 85 an internal thread 46 or a clearance hole for the axial mounting of the housing sections 75 with the toothed ring by means of a screw or rivet connection follows the guide sections.

The guide pin 81 in the illustration according to FIG. 9 is a separate sleeve, which is mounted in the radial flange 77 of the corresponding housing section 75. Each guide pin 81 extends through a clearance hole 35 of a flange with hole at the other of the housing sections 75 into a guide hole 85 of the corresponding toothed ring. From a cross-sectional point of view the inner contour of the clearance hole 85 in the toothed ring corresponds accurately fitting to the outer contour of the guide pin 81. The toothed ring and the housing 68 are concentrically centered to each [missing text] to the rotational axis 4 and axially attached to one another with a screw 45.

LIST WITH REFERENCE NUMBERS

4 Rotational axis
5 Planet carrier
6 Driven gear
7 Driven gear
14 Planet gear
15 Planet gear
16 Pin axis
17 Pin axis
21 Planet gear
22 Planet gear
29 Planetary shaft
30 Planetary shaft
31 Receptacle for planetary shaft
32 Receptacle for planetary shaft
35 Clearance hole for radial flange
36 Spur gear differential of the category-defining prior art.

37 Toothed section of the planet gear
40 Sun gear
41 Sun gear
43 Non-toothed section of the planet gear
44 Outer segment of toothed section
45 Screw
46 Internal thread
48 Middle segment of the toothed section
49 Peripheral gap
50 Sum wheel
51 Outer toothing of the sun gear
52 Outer toothing of the sun gear
62 Mounting section
63 Flange section
64 Curved wall sections
65 Bottom of the pot
66 Spur gear differential
67 Drive wheel
68 Housing
69 Sun gear
70 Sun gear
71 Hollow cylindrical section of the sun gear.
72 Hollow cylindrical section of the sun gear
73 Ball bearing
74 Ball bearing
75 Housing section
76 Pot
77 Radial flange
78 Radial feed in the pot
79 Guide pin
80 Guide pin
81 Guide pin
82 Guide pin
83 Clearance hole
84 Internal thread
85 Guide hole

The invention claimed is:

1. Spur gear differential comprising a housing that is embodied as a sum wheel and that rotates around a longitudinal rotational axis, at least three planet gears disposed on the periphery at a distance in relation to each other around the rotational axis, and a drive wheel at the housing, with
the housing comprised of at least two housing sections fixed to each other,
each of the planet gears mounted longitudinally on both sides in the housing sections,
at least one of the housing sections formed in the shape of a pot, with the housing section formed from a pot having a base arranged on the front side of the housing, a wall starting from the base and extending around the rotational axis,
each of the planet gears mounted longitudinally on one side at the base of the pot,
the wall of the pot comprising at least two wall sections curved towards the inside in a radial manner, said wall sections each dipping radially, at least in part, into a peripheral gap between two of the planet gears that are adjacent to each other on the periphery,
at least in the peripheral gap one flange section each starting from the curved sections in a radial manner,
and with mounting sections starting from the drive wheel towards the inside in a radial manner dipping into the peripheral gap at least partially in a radial manner, and mounted to the flange section.

2. Spur gear differential in accordance with claim 1, at which the flange section comprises a longitudinally aligned clearance hole, through which a mounting means extends into the mounting section.

3. Spur gear differential in accordance with claim 2, with the mounting means representing a screw, with said screw extending into an external thread in the mounting section.

4. Spur gear differential in accordance with claim 1, with at least two of the pot-shaped housing sections, said sections being axially fixed to each other and mirror-inverted to each other, with the drive wheel fixed at one of the housing sections in an axial manner.

5. Spur gear differential in accordance with claim 4, with the housing sections being identical parts.

6. Spur gear differential in accordance with claim 1, with at least four pairs of planet gears, of which the planet gears are engaged with each other in each pair, and of which each planet gear of a pair engages with a different sun gear than the other planet gear of the same pair, with the sun gears mounted at least in part in the and with one of the mounting sections each of the drive wheel dipping at least in part in a radial manner into one periphery gap each between two pairs that are adjacent to each other on the periphery, and mounted there at the flange section.

* * * * *